(12) United States Patent
Guerrini

(10) Patent No.: US 8,693,576 B2
(45) Date of Patent: Apr. 8, 2014

(54) METHOD OF TRANSMITTING SYMBOLS

(75) Inventor: Eleonora Guerrini, Aosta AO (IT)

(73) Assignee: Dora S.p.A., Aosta, Ao (IT)

( * ) Notice: Subject to any disclaimer, the term of this patent is extended or adjusted under 35 U.S.C. 154(b) by 242 days.

(21) Appl. No.: 13/243,574

(22) Filed: Sep. 23, 2011

(65) Prior Publication Data

US 2012/0134427 A1     May 31, 2012

(30) Foreign Application Priority Data

Nov. 29, 2010    (IT) ............................... VA2010A0085

(51) Int. Cl.
*H04L 27/36*      (2006.01)

(52) U.S. Cl.
USPC ........................................................ 375/298

(58) Field of Classification Search
USPC ........................................................ 375/298
See application file for complete search history.

(56) References Cited

U.S. PATENT DOCUMENTS

| | | | | |
|---|---|---|---|---|
| 6,134,273 | A * | 10/2000 | Wu et al. ....................... | 375/261 |
| 2005/0047517 | A1 * | 3/2005 | Georgios et al. .............. | 375/267 |
| 2005/0135497 | A1 * | 6/2005 | Kim et al. ...................... | 375/267 |
| 2005/0195905 | A1 * | 9/2005 | Kowalski ....................... | 375/260 |
| 2006/0120474 | A1 * | 6/2006 | Hong et al. .................... | 375/261 |
| 2007/0092036 | A1 * | 4/2007 | Birru .............................. | 375/301 |
| 2008/0232499 | A1 * | 9/2008 | Guerrieri et al. .............. | 375/261 |
| 2009/0135934 | A1 | 5/2009 | Guerrieri et al. | |

FOREIGN PATENT DOCUMENTS

EP         2458769 A1 * 5/2012

OTHER PUBLICATIONS

Guerrini, "Bit-loading algorithms and SNR estimates for HomePlug AV," IEEE ISPLC 2007, pp. 77-82, Mar. 2007.*
Guerrini, "LLR-based bit-loading algorithm for the turbo coded HomePlug AV," IEEE Global Telecommunications Conference, GLOBECOM, pp. 140-145, Nov. 26-30, 2007.*
Wyglinski, "loading with BER-constraint for multicarrier systems," IEEE Trans. on Wireless Comm., pp. 1383-1387, Jul. 2005.*
Guerrini et al., Bit-loading algorithms and SNR estimate for HomePlug AV, 2007, pp. 77-82.
Wyglinski et al., Bit Loading With BER-Constraint for Multicarrier Systems, 2005, pp. 1383-1387.
J. A. C. Bingham, "Multicarrier modulation for data transmission: an idea whose time has come," IEEE Comm. Magazine, pp. 5-14, May 1990.
J. Campello, "Optimal discrete bit loading for multicarrier modulation systems," IEEE Symp. Info. Theory, p. 193, Aug. 1998.

(Continued)

*Primary Examiner* — Juan A Torres

(74) *Attorney, Agent, or Firm* — Allen, Dyer, Doppelt, Milbrath & Gilchrist, P.A.

(57) ABSTRACT

A method of transmitting symbols of a digital transmission constellation from a set thereof, ordered from a smallest to a greatest number of bits per symbol, may include identifying a first constellation from the set that is configured to communicate with a threshold error rate and has a greatest signal-to-noise ratio smaller than a signal-to-noise ratio of a received signal. The method may also include identifying a second constellation from the set that corresponds to a constellation with a number of bits per symbol immediately greater than the first constellation. The method may further include determining first and second probabilities of use of the first and second constellations that would generate an expected number of erroneous bits corresponding to the threshold error rate. The method may further include transmitting a symbol with a constellation selected randomly between the first and second constellations according to the first and second probabilities, respectively.

19 Claims, 12 Drawing Sheets

(56) References Cited

OTHER PUBLICATIONS

A. Leke and J. M. Cioffi, "A maximum rate loading algorithm for discrete multitone modulation systems," IEEE Globecom 1997, pp. 1514-1518, Nov. 1997.

B. S. Krongold, K. Ramchandran and D. L. Jones, "Computationally efficient optimal power allocation algorithms for multicarrier communication systems," IEEE Trans. on Comm., pp. 23-27, Jan. 2000.

P. S. Chow, J. M. Cioffi and J. A. C. Bingham, "A practical discrete multitone transreceiver loading algorithm for data transmission over spectrally shaped channels," IEEE Trans. on Comm., pp. 773-775, Apr. 1995.

R. F. H. Fisher and J. B. Huber, "A new loading algorithm for discrete multitone transmission," IEEE Globecom 1996, pp. 724-728, Nov. 1996.

J. Campello, "Practical bit loading for DMT," IEEE ICC 1999, pp. 801-805, Jun. 1999.

N. Papandreou and T. Antonakopoulos, "A new computationally efficient discrete bit-loading algorithm for DMT applications," IEEE Trans. On Comm., pp. 785-789, May 2005.

D. Matas and M. Lamarca, "Optimum power allocation and bit loading with code rate constraint," IEEE SPAWC 2009, pp. 687-691, Jun. 2009.

H. Y. Qing and P. Q. C. M. Jiao, "An efficient bit and power allocation algorithm for multi-carrier systems," IEEE ICCCAS 2009, pp. 100-103, Jul. 2009.

A. Maiga, J.-Y. Baudais and J.-F. Hélard, "Very high bit rate power line communications for home networks," IEEE ISPLC 2009, pp. 313-318, Mar. 2009.

\* cited by examiner

METHOD OF TRANSMITTING SYMBOLS

FIELD OF THE INVENTION

This invention relates to digital communications, and more particularly, to a method of transmitting symbols that implements a stochastic algorithm.

BACKGROUND OF THE INVENTION

Research in multi-carrier modulation has grown tremendously in recent years due to the demand for high-speed data transmission over fading channels (e.g. power line, wireless, etc.) where inter-symbol interference (ISI) can occur. Instead of employing single-carrier modulation with a very complex adaptive equalizer, the channel is typically divided into N sub-channels that may be essentially ISI-free independent Gaussian channels.

The so-called "bit loading" is a widely employed technique in multi-carrier systems to efficiently assign bits to each carrier depending on the signal-to-noise ratio (SNR). In general, bit loading techniques allow transmitting a higher number of bits over the carriers where the SNR is higher and a lower number of bits over the carriers where the SNR is lower.

To better understand the field of application, reference is made to the so-called HomePlug AV (HPAV) communication system, though any skilled reader will appreciate that the proposed approach may be applied also to systems different from HPAV, that is herein illustrated purely as a non-limiting example.

HomePlug® (See, for example, http://www.homeplug.org/home/), an industrial organization that comprises more than 70 companies, was formed in 2000 to develop and standardize specifications for home networking technology using existing power line wiring. The last generation technology of HomePlug®, called HomePlug AV (HPAV) (See for example, HomePlug® PowerLine Alliance, "HomePlug AV baseline specification," Version 1.1, May 2007—"HomePlug AV white paper," http://www.homeplug.org/tech/whitepapers/HPAV-White-Paper 050818.pdf), is a communication system where the proposed bit loading algorithm can be applied.

In FIG. 1, the HPAV physical layer that is the basis of analysis is shown. As explained in HomePlug® PowerLine Alliance, "HomePlug AV baseline specification," Version 1.1, May 2007, the input bits from the medium access control (MAC) are structured by the HPAV transmitter differently depending on whether they are HPAV data, HPAV control information, or HomePlug 1.0 control information. In the present application, for the sake of simplicity, the more common HPAV data format will only be referred to. At the transmitter, the information bits are scrambled and fed into a turbo convolutional encoder with a code rate R. The code rate can be R=½ or, after puncturing, R=16/21. The coded sequences are then bit-by-bit interleaved and converted into QAM symbols through a bit-mapper. The data symbols (belonging to unit power constellations) are serial-to-parallel-converted for orthogonal frequency division multiplexing (OFDM) modulation. Each OFDM carrier can be differently loaded, depending on the bit loading algorithm, with one of the available modulations: BPSK, QPSK, 8-QAM, 16-QAM, 64-QAM, 256-QAM and 1024-QAM. In HPAV, the OFDM modulation is implemented by using a 3072-point inverse discrete Fourier transform (IDFT). Furthermore, to comply with frequency regulatory bodies it is typically not possible to use of all the carriers. For example, according to United States regulations, only 917 carriers, out of the 1536 carriers from DC to 37.5 MHz, can be employed for useful transmission.

To reduce the complexity of the receiver, a suitable cyclic prefix may be used to remove both ISI and inter-channel interference (ICI). Before an analog front end (AFE) block, which sends the resulting signal to the power line channel, a peak limiter block may be inserted to reduce the peak-to-average power ratio (PAPR). At the receiver the signal after an AFE block is fed to automatic gain control (AGC) and time synchronization blocks. The cyclic prefix is removed and the OFDM demodulation, which is implemented by the 3072-point discrete Fourier transform (OFT), is performed. The following assumptions are made:

i) the cyclic prefix completely eliminates ISI and ICI;
  ii) a perfect synchronization is guaranteed, and
  iii) the channel is time invariant within each packet.

The output from the OFDM demodulator is sent to a soft-input soft-output (SISO) de-mapper, a de-interleaver, and a turbo convolutional decoder, which, in the approach of the present embodiment, implements the Bahl, Cocke, Jelinek, and Raviv (BCJR) algorithm (See for example, L. R. Bahl, J. Cocke, F. Jelinek, and J. Raviv, "Optimal decoding of linear codes for reducing symbol error rate," *IEEE Trans. On Inform. Theory*, vol. 20, pp. 284-287, March 1974) in an improved Max-Log-MAP form (See for example, J. Vogt and A. Finger, "Improving the max-log MAP turbo decoder," *IEEE Elect. Lett.*, vol. 36, pp. 1937-1939, November 2000). Successively, the bits provided by the decoder are de-scrambled to reconstruct an estimation of the transmitted bits. To complete the description of FIG. 1, the SNR estimate module performs the estimation of the SNR starting from the signal produced by the demodulator and it is input to the bit loading block.

The problem of bit loading has been widely studied in the literature, and it is part of a more general problem that is the possibility of redistributing the power and the bits available over the various carriers, as a function of the SNR, to improve the overall performance of the system.

A milestone method, the "water filling" algorithm (See for example, R. G. Gallager, *Information theory and reliable communication*, New York, Wiley, 1968), has been known to generate the optimal energy distribution and to achieve the maximum capacity. However, even if it yields the optimal energy distribution, the maximum capacity could be achieved only if an infinite granularity in constellation size is assumed, which is not realizable. For this reason, suboptimal approaches have been studied, such as, for example, in J. A. C. Bingham, "Multicarrier modulation for data transmission: an idea whose time has come," *IEEE Comm. Magazine*, pp. 5-14, May 1990, but the proposed approach is very slow for applications that transmit over a large number of carriers and where a high number of bits can be loaded in each symbol. In the past, the loading issue has been analyzed using two main different approaches (See for example, J. Campello, "Optimal discrete bit loading for multicarrier modulation systems," *IEEE Symp. Info. Theory*, pp. 193, August 1998), referred to as "bit rate maximization" and "margin maximization", respectively. The bit rate maximization approach aims at maximizing the overall throughput of the system with a constraint on the transmission power. (See for example, A. Leke and J. M. Cioffi, "A maximum rate loading algorithm for discrete multitone modulation systems," *IEEE Globecom 1997*, pp. 1514-1518, November 1997, and B. S. Krongold, K. Ramchandran and D. L. Jones, "Computationally efficient optimal power allocation algorithms for multicarrier communication systems," *IEEE Trans. on Comm.*, pp. 23-27, Jan. 2000).

The margin maximization approach aims, instead, at minimizing the transmission power with a constraint on the overall throughput of the system. (See for example, P. S. Chow, J. M. Cioffi and J. A. C. Bingham, "A practical discrete multitone transceiver loading algorithm for data transmission over spectrally shaped channels," *IEEE Trans. on Comm.*, pp. 773-775, April 1995, R. F. H. Fisher and J. B. Huber, "A new loading algorithm for discrete multitone transmission," *IEEE Globecom* 1996, pp. 724-728, November 1996, J. Campello, "Practical bit loading for DMT," *IEEE ICC* 1999, pp. 801-805, June 1999, and N. Papandreou and T. Antonakopoulos, "A new computationally efficient discrete bit-loading algorithm for DMT applications," *IEEE Trans. On Comm.*, pp. 785-789, May 2005). The proposed approaches are based on the possibility of redistributing the power and the bits over the various carriers. Other examples of algorithms where power and bit loading issues are jointly studied can be found in D. Matas and M. Lamarca, "Optimum power allocation and bit loading with code rate constraint," *IEEE SPAWC* 2009, pp. 687-691, June 2009, and H. Y. Qing and P. Q. C. M. Jiao, "An efficient bit and power allocation algorithm for multi-carrier systems," *IEEE ICCCAS* 2009, pp. 100-103, July, 2009.

On the other hand, communication systems can be subject to regulations that do not allow power allocation. A typical example is the HomePlug AV (HPAV) system, where the algorithms described above cannot be applied. In fact, these systems with uniform (non-adaptive) power allocation are in the field of application of the approach proposed in the present application.

In this case, suitable bit loading algorithms are described in A. M. Wyglinski, F. Labeau, and P. Kabal, "Bit loading with BER-constraint for multicarrier systems," *IEEE Trans. on Wireless Comm.*, pp. 1383-1387, July 2005, E. Guerrini, G. Dell'Amico, P. Bisaglia and L. Guerrieri, "Bit-loading algorithms and SNR estimates for HomePlug AV," *IEEE ISPLC* 2007, pp. 77-82, March 2007, U.S. Patent Application Publication No. 2009/0135934 to Guerrieri et al., and A. Maiga, J.-Y. Baudais and J.-F. Hélard, "Very high bit rate power line communications for home networks," *IEEE ISPLC* 2009, pp. 313-318, March 2009.

All these approaches aim at maximizing the overall throughput of the system, guaranteeing, at the same time, that the bit error rate (BER) remains below a given threshold, hereafter referred to as a target BER. In A. M. Wyglinski, F. Labeau and P. Kabal, "Bit loading with BER-constraint for multicarrier systems," *IEEE Trans. on Wireless Comm.*, pp. 1383-1387, July 2005, and E. Guerrini, G. Dell'Amico, P. Bisaglia and L. Guerrieri, "Bit-loading algorithms and SNR estimates for HomePlug AV," *IEEE ISPLC* 2007, pp. 77-82, March 2007, different techniques have been proposed for multi-carrier uncoded systems. However, if applied to a coded system, they do not exploit the error-correction capabilities of the code, which means that the target BER is satisfied with a large margin, but at the expense of a reduction in terms of throughput.

In U.S. Patent Application Publication No. 2009/0135934 to Guerrieri et al., a bit loading algorithm that aims at exploiting the error capability of the turbo code using a metric based on the LLRs is presented. Although the achieved performance is relatively good, the iterative nature of the algorithm implies a high computational complexity. The approach proposed in A. Maiga, J.-Y. Baudais and J.-F. Hélard, "Very high bit rate power line communications for home networks," *IEEE ISPLC* 2009, pp. 313-318, March 2009, can be applied to a linear precoded discrete multitone modulation (LP-DMT) system, which implements a combination of multi-carrier and spread spectrum techniques. In the contest of bit loading and turbo code there is still the need of an algorithm that efficiently exploits the error-correction capability of the code, but that has a reduced complexity.

SUMMARY OF THE INVENTION

A method of transmitting symbols of a digital transmission constellation that allows an increase in the transmission throughput with a pre-established bit-error rate or block error rate is described. Differently from the classic bit loading algorithms, the algorithm of the present embodiments may be not fully deterministic, but comprises a stochastic operation for deciding whether to transmit symbols according to a first constellation or to a second constellation. More precisely, the novel method comprises the steps of:

a) identifying a first digital transmission constellation m of an ordered set, that allows a communication with a pre-established maximum bit-error-rate or block-error-rate $\beta^{(T)}$ and with the greatest signal-to-noise ratio smaller than the signal-to-noise ratio of the received signal $\gamma$;

b) identifying a second digital transmission constellation $\tilde{m}$ of the ordered set that corresponds to the constellation with the number of bits per symbol immediately greater than that of the first digital transmission constellation m;

c) determining a first probability of use $1-P$ of the first digital transmission constellation and a second probability of use P of the second digital transmission constellation that would make the expected number of received erroneous bits corresponding to the pre-established maximum bit-error-rate or block-error-rate $\beta^{(T)}$. The second probability may be complementary to the first probability and may be determined as a function of the bit-error-rates or block-error-rate of the first $P_e^{(m)}(\gamma)$ digital transmission constellations and second $P_e^{(\tilde{m})}(\gamma)$ corresponding to the signal-to-noise ratio of the received signal $\gamma$, and to the number of bits of a symbol of the first constellation m and of the second constellation $\tilde{m}$;

d) transmitting a symbol with a digital transmission constellation selected randomly between the constellations first and second according to the respective probabilities of use first $1-P$ and second P.

The algorithm may be advantageously used for transmitting a plurality of symbols in a multi-carrier modulation system or in a HomePlug AV system. The algorithm may be implemented by a computer or processor executing a software program.

DETAILED DESCRIPTION OF THE PREFERRED EMBODIMENTS

Figure 1:
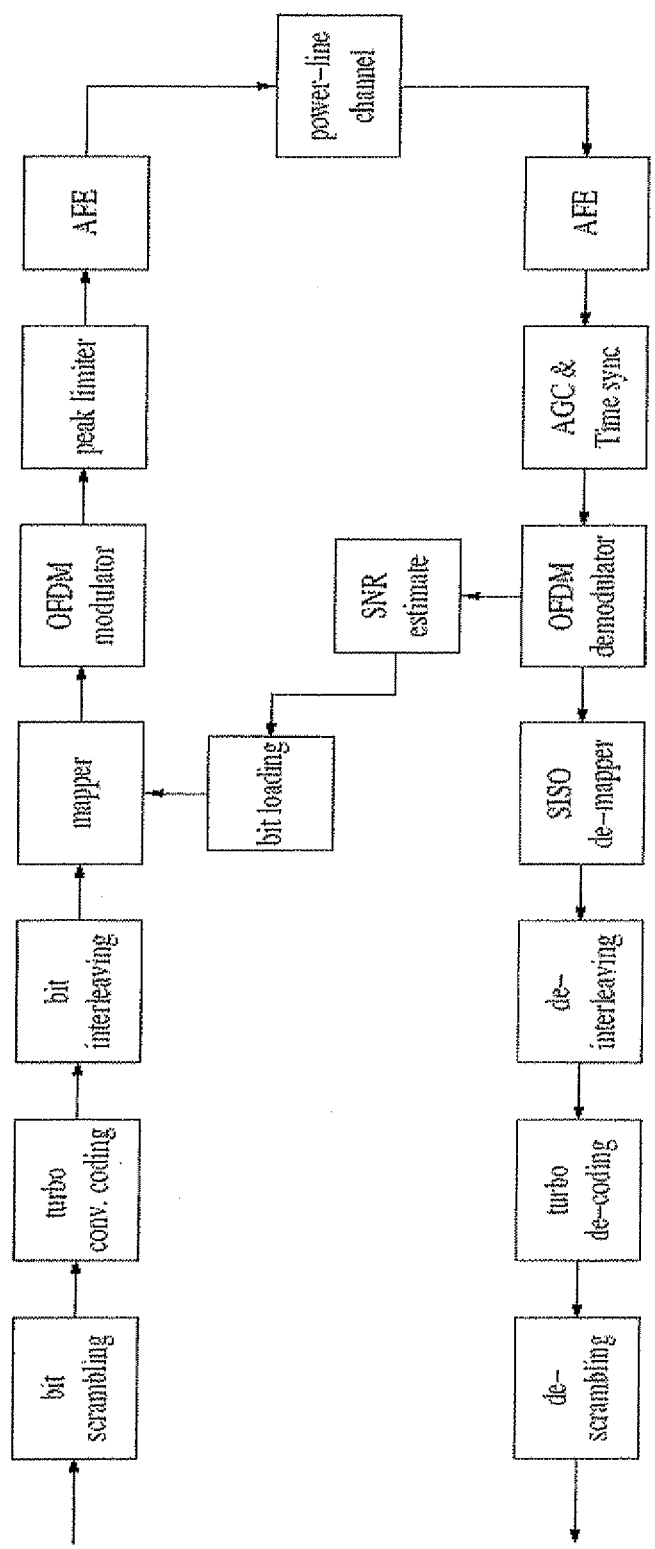
FIG. 1 is a block diagram for a HPAV physical layer, for data transmission in accordance with the prior art.

The bit loading algorithm disclosed herein, that may be classified as an algorithm that aims at increasing the throughput while achieving an overall target BER or, alternatively, an overall target block error rate (BLER) with a relatively uniform power allocation, efficiently exploits the error-correction capability of the code and has a reduced complexity. Differently from the known bit loading techniques based on deterministic rules, the algorithm contemplates a probabilistic approach and it may be applied to both coded and uncoded systems.

Before introducing the bit loading algorithm, hereinafter referred as the Jump Probability Computation (JPC) algorithm, the prior BTC bit loading algorithm disclosed in, U.S. Patent Application Publication No. 2009/0135934 to Guerrieri at al., is revisited, to better understand how the algorithm operates.

The following nomenclature will be used:
N: number of carriers;
k: carrier index, k=1, 2, . . . , N;
$m_k$: number of bits loaded on the k-th carrier;
$\gamma_k$: SNR of the k-th carrier;
$\beta^{(T)}$: fixed target BER or BLER
$\gamma^{(m_k,T)}$: SNR limit value to achieve the fixed target $\beta^{(T)}$ when $m_k$ bits are loaded on the k-th carrier; and
C: set of all the possible numbers of bits that can be mapped.

BER Threshold Constant (BTC) Algorithm

The prior art BTC algorithm attempts to increase the overall throughput of the system with a uniform power allocation, achieving a target BER (or BLER) per carrier. In general, the BER (or BLER) performance of a system as a function of the SNR can be obtained by simulations. For example, in L. Guerrieri, P. Bisaglia, G. Dell'Amico and E. Guerrini, "Performance of the turbo coded HomePlug AV system over power-line channels,"*IEEE ISPLC* 2007, pp. 138-143, March 2007 it has been computed for the coded HPAV system. Consequently, for each constellation, an SNR limit value can be fixed for a given target BER (or BLER).

The problem solved by the BTC is:

$$\begin{cases} \max_{m_k \in C} m_k \\ \text{s.t.} \gamma_k \geq \gamma^{(m_k,T)} \end{cases} k = 1, 2, \ldots, N \quad (1)$$

The algorithm may optionally employ a memory look-up table that includes the SNR limit value for each allowable modulation.

In ideal conditions, i.e., when any estimation is not performed and the channel state information (CSI) is assumed to be known at the receiver, the BTC algorithm is a conservative bit loading. That means that the target BER (or BLER) is achieved with a large margin and with a consequent loss in throughput.

The Algorithm of the Present Embodiments

The algorithm, herein referred as "Jump Probability Computation algorithm" (JPC), starts from an allocation based on the BTC and it may increase the throughput and reduce the margin over the overall target BER (or BLER).

In the JPC algorithm, after the constellation assignment based on the classic BTC algorithm, a "jump" is made into the constellation of the immediately higher order depending on an appropriate probability defined for each carrier, while still achieving the overall target BER (or BLER) of the system.

Let $P_k$ be the probability of a jump into the constellation of the immediately higher order for the k-th carrier and let $p_k$ be a random variable uniformly distributed within [0, 1]. The JPC algorithm may be detailed in the following steps:

1. Evaluate a first bit allocation $\{m_k\}$ based on the BTC algorithm;
2. Determine the bit allocation $\{\breve{m}_k\}$ that corresponds to the immediately higher constellation, with $\breve{m}_k \in C$;
3. Given the SNR over each carrier $\{\gamma_k\}$, compute the respective probability of jump $\{P_k\}$. The computation of $\{P_k\}$ will be described hereinafter;
4. Generate $\{p_k\} \in U[0, 1]$; and
5. The final bit allocation $\{q_k\}$ is given by $$q_k = \begin{cases} m_k & \text{if } p_k > P_k \\ \breve{m} & \text{if } p_k \leq P_k \end{cases} \quad k = 1, 2, \ldots, N \quad (2)$$

It should be noted that the target BER (or BlER) is achieved only if the number of realizations is large enough to have reliable statistics. This means that the target is achieved over each carrier after a proper observation time and it is achieved per groups of carriers if the number of carriers is sufficiently large. Hereinafter the computation of $P_k$ is explained.

The computation of $P_k$, the probability of a jump into the constellation of the immediately higher order for the k-th carrier, is an issue that may be of particular importance for the JPC bit loading algorithm, since the performance of the algorithm depends on the accuracy of $P_k$. Furthermore, a fast computation may be fundamental for an efficient implementation of the proposed approach. In general, referring to the k-th carrier, $P_k$ depends on the fixed target BER (or BLER) $\beta^{(T)}$, on the SNR $\gamma_k$, and on the constellations associated with $m_k$ and $\breve{m}_k$. For the computation of the probability of a jump, an additive white Gaussian noise (AWGN) channel may be considered, where the SNR $\gamma_k$ is the same for each carrier, i.e.

$\gamma_k=\gamma$ with k=1, 2, ..., N. In an AWGN channel, the bit allocation is the same for each carrier, hence the carrier index can be neglected $m_k=m$, and also $P_k$ is the same for each carrier $P_k=P$, with k=1, 2, ..., N. Hereinafter, different procedures to compute P given γ are described. In specific cases, if the BER (or BLER) can be expressed in a closed-form, the value of P may be analytically computed. For all the other cases, an alternative procedure is implemented.

To apply the above procedure, the closed-form expressions of the BER (or BLER) as a function of the SNR should typically be available for all the considered constellations. If this assumption is verified, let $\beta^{(T)}$ be the fixed target BER and let $\gamma^{(m,T)}$ and $\gamma^{(\tilde{m},T)}$ be the SNR thresholds of the BTC algorithm that allow loading m and $\tilde{m}$ bits, respectively. For each $\gamma \in (\gamma^{(m,T)}, \gamma^{(\tilde{m},T)})$, the probability of a jump from the constellation that loads m bits to the constellation that loads $\tilde{m}$ bits is computed. In a multi-carrier system with N available carriers, the total number of loaded bits is $$n = n^{(m)} + n^{(\tilde{m})} \quad (3)$$

where $n^{(m)}$ and $n^{(\tilde{m})}$ are the number of bits mapped over the carriers that load m and $\tilde{m}$ bits, respectively. Assuming a probability of a jump $\tilde{P}$, these parameters can be expressed as follows $$n^{(m)} = (1-\tilde{P}) \cdot m \cdot N \quad (4)$$

$$n^{(\tilde{m})} = \tilde{P} \cdot \tilde{m} \cdot N \quad (5)$$

With this bit loading, the overall BER, $\tilde{\beta}$, is given by $$\tilde{\beta} = P_e^{(m)}(\gamma) \cdot \frac{n^{(m)}}{n} + P_e^{(\tilde{m})}(\gamma) \cdot \frac{n^{(\tilde{m})}}{n} \quad (6)$$

where $P_e^{(m)}(\gamma)$ and $P_e^{(\tilde{m})}(\gamma)$ are the BER associated with the constellations of m and $\tilde{m}$ bits, respectively, at an SNR of γ. Substituting (3)-(5) in (6), the overall BER becomes $$\tilde{\beta} = \frac{P_e^{(m)}(\gamma) \cdot (1-\tilde{P}) \cdot m + P_e^{(\tilde{m})}(\gamma) \cdot \tilde{P} \cdot \tilde{m}}{(1-\tilde{P}) \cdot m + \tilde{P} \cdot \tilde{m}} \quad (7)$$

hence we have $$\tilde{P} = \frac{(P_e^{(m)}(\gamma) - \tilde{\beta}) \cdot m}{(P_e^{(m)}(\gamma) - \tilde{\beta}) \cdot m - (P_e^{(\tilde{m})}(\gamma) - \tilde{\beta}) \cdot \tilde{m}} \quad (8)$$

The probability of jump, P, that achieves the fixed target BER is the value that satisfies equation (8) when $\tilde{\beta}=\beta^{(T)}$, and it is given by:

$$P = \frac{(P_e^{(m)}(\gamma) - \beta^{(T)}) \cdot m}{(P_e^{(m)}(\gamma) - \beta^{(T)}) \cdot m - (P_e^{(\tilde{m})}(\gamma) - \beta^{(T)}) \cdot \tilde{m}} \quad (9)$$

An example of a system where the analytical procedure can be applied is an uncoded system. In N. Benvenuto and G. Cherubini, *Algorithms for communications systems and their applications*, John Wiley & Sons, Chichester, U.K., 2002. the closed-form expressions of BER, as a function of the SNR, are computed for PAM, QAM, PSK and FSK modulations.

In general, the BER (or BLER) closed-form expressions may be unavailable or too complex to be efficiently used. Therefore, an alternative approach may be proposed. A general procedure, based on simulations, to compute P for a given γ is by the following:

I. Fix the target BER (or BLER).

II. Define a range of SNRs of interest, which includes all the SNRs where the available constellations can properly work, namely $[\gamma^{LOW}, \gamma^{HIGH}]$. The range of SNRs of interest may depend on the considered system, in particular, on its architecture (modulations and demodulation types, coding and decoding schemes etc.).

III. Define a set of SNRs, which belong to $[\gamma^{LOW}, \gamma^{HIGH}]$, hereafter referred as Ω. The number of the elements of the set influences the accuracy of the computation of P: the higher the number is, the better the accuracy is.

IV. Fix an arbitrary value for the probability of jump, $\overline{P}$. The initial assigned value, $\overline{P}$, and the following assigned values indicated in point VII, can be arbitrary selected within the range (0, 1).

V. For each γ∈Ω:

a. Evaluate the bit allocation {m} based on the BTC algorithm.

b. Apply the JPC algorithm with the probability of jump $\overline{P}$, obtaining the bit allocation $\{\overline{q}\}$.

c. Compute, by simulations, the overall BER (or BLER) of the system with the bit allocation $\{\overline{q}\}$.

VI. Store the SNRs that achieve the target BER (or BLER), hereafter referred as $\gamma_{\{m\}}^{\overline{P}}$. Note that there is an SNR for each constellation.

VII. Repeat point V-VI for other L values of $\overline{P}$. Let $\{\overline{P_1}, P_2, \ldots, \overline{P_L}\}$ be the considered values of the jump probability. The values $\mathcal{A} = \{(\overline{P_1}, \gamma_{\{m\}}^{\overline{P_1}}), (\overline{P_2}, \gamma_{\{m\}}\overline{huP_2}), \ldots, (\overline{P_L}, \gamma_{\{m\}}\overline{huP_L}): \forall m \in C\}$ are stored.

VIII. Given an SNR $\tilde{\gamma} \in \Omega$, interpolate the points stored in $\mathcal{A}$ in order to compute the relative probability of jump $\tilde{P}$.

Figure 2:
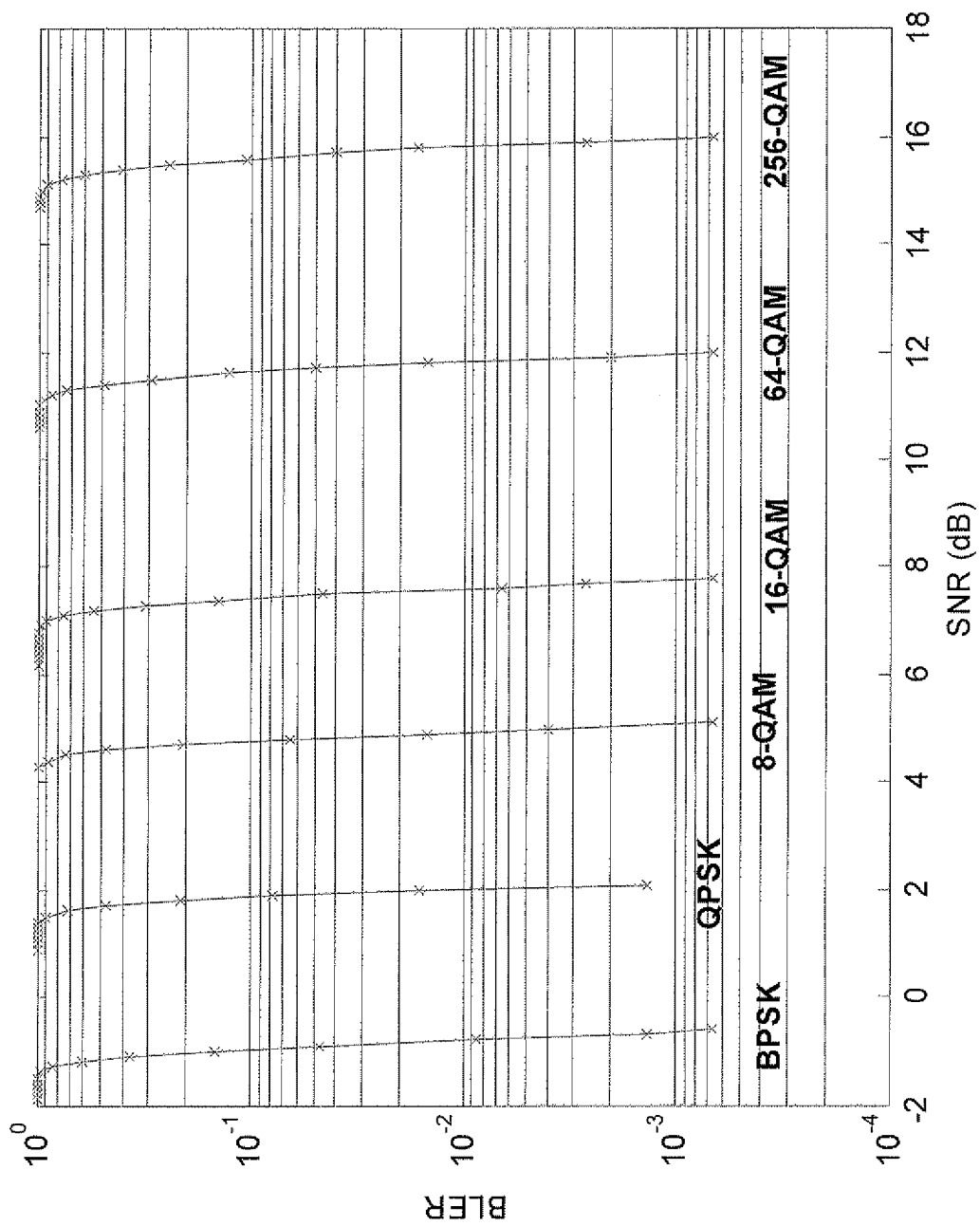
FIG. 2 is a graph comparing the BLER vs. SNR of an HPAV system, with code rate R=½, over an AWGN channel when the JPC bit loading algorithm is applied with a target BLER of $10^{-1}$ and a jump probability of 0.25 in accordance with the present invention.

To clarify the procedure, an example of the computation of the probability of a jump is given in the case of the HPAV system. First, let us fix a target BLER of $10^{-1}$, as in point I. Considering the aforementioned target BLER, a reasonable range of SNRs, Ω, for the HPAV system could be [−5 dB, 20 dB] in the case of R=½ and [0 dB, 35 dB] in the case of R=16/21(point II). For the sake of simplicity, the example is explained for the R=½ case only, but it can be easily extended to the R=16/21 case. According to point III, the set of SNRs is formed by the SNRs within the range [−5 dB, 20 dB] with a step of 0.1 dB. First, the probability of a jump $\overline{P}$ is set equal to 0.25 (point IV). Furthermore, for all the SNRs of the set, the BTC algorithm is applied (point V-a), the final bit allocation given by the JPC algorithm is evaluated (point V-b), and the overall BLER of the system is computed (point V-c). In FIG. 2, the BLER, as a function of the SNR, achieved performing the JPC algorithm with a jump probability of 0.25, is shown for each available constellation of the HPAV system.

Figure 3:
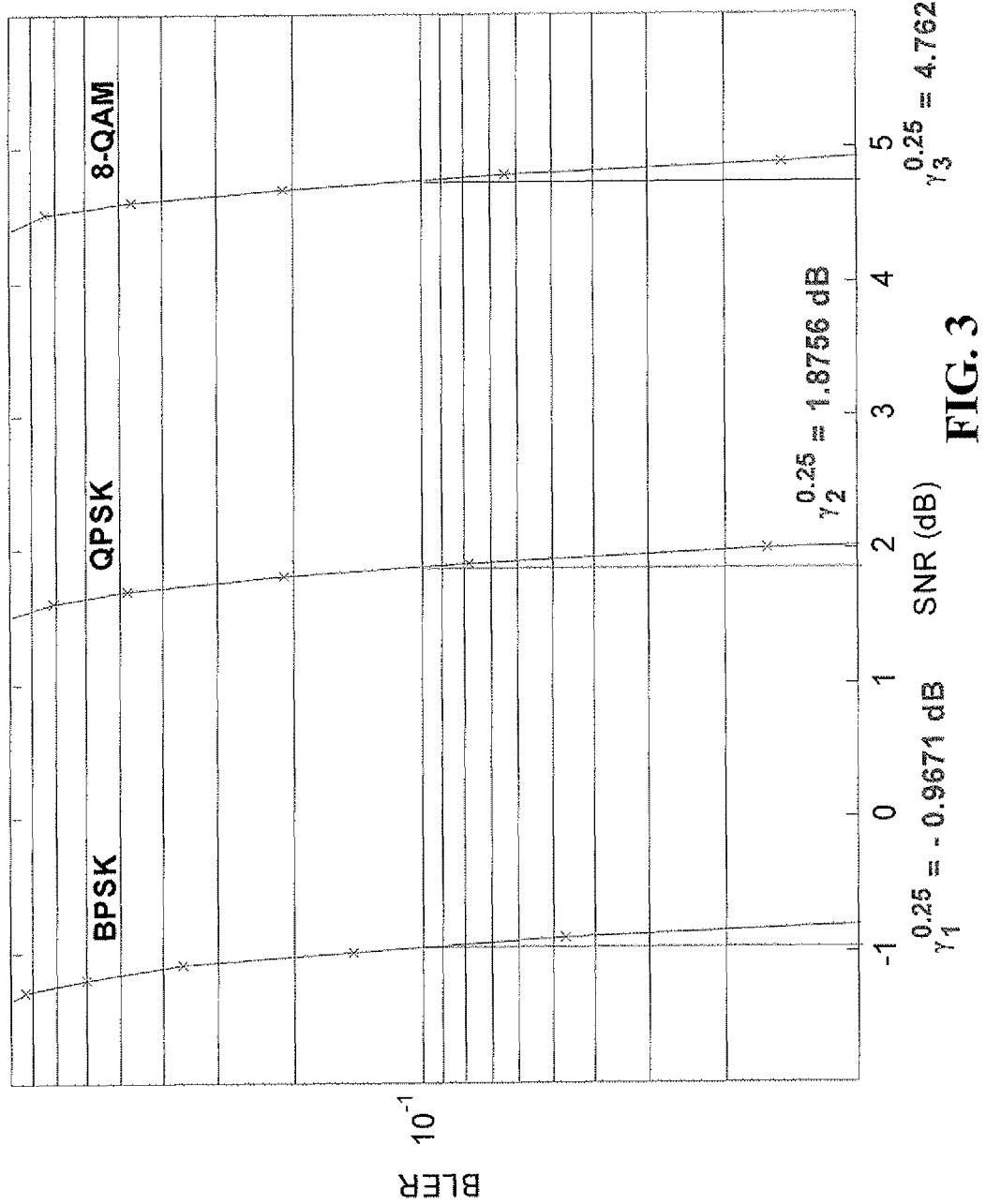
FIG. 3 is an enlarged view of FIG. 2 where the SNRs that achieve the target BLER are highlighted for BPSK, QPSK and 8-QAM constellations, which are $\gamma_1^{0.25}$=−0.9671 dB, $\gamma_2^{0.25}$=1.8756 dB and $\gamma_3^{0.25}$=4.7629 dB, respectively.

The labels correspond to the constellation loaded by the BTC, but the respective curves may not be obtained with this constellation only. For example, the "BPSK" curve may be obtained randomly loading about 75% of BPSK and 25% of QPSK, accordingly to the jump probability of 0.25. The 1024-QAM is not present since in HPAV system it is not possible to jump into a higher constellation. Still referring to FIG. 2, the SNRs that achieve the fixed target BLER with a jump probability of 0.25, $\gamma_{\{m\}}^{0.25}$, are selected for each constellation (point VI). FIG. 3 is an enlargement of FIG. 2 where the SNRs that achieve the target BLER with a jump probability of 0.25 for the BPSK, QPSK, and 8-QAM are highlighted.

Figure 4:
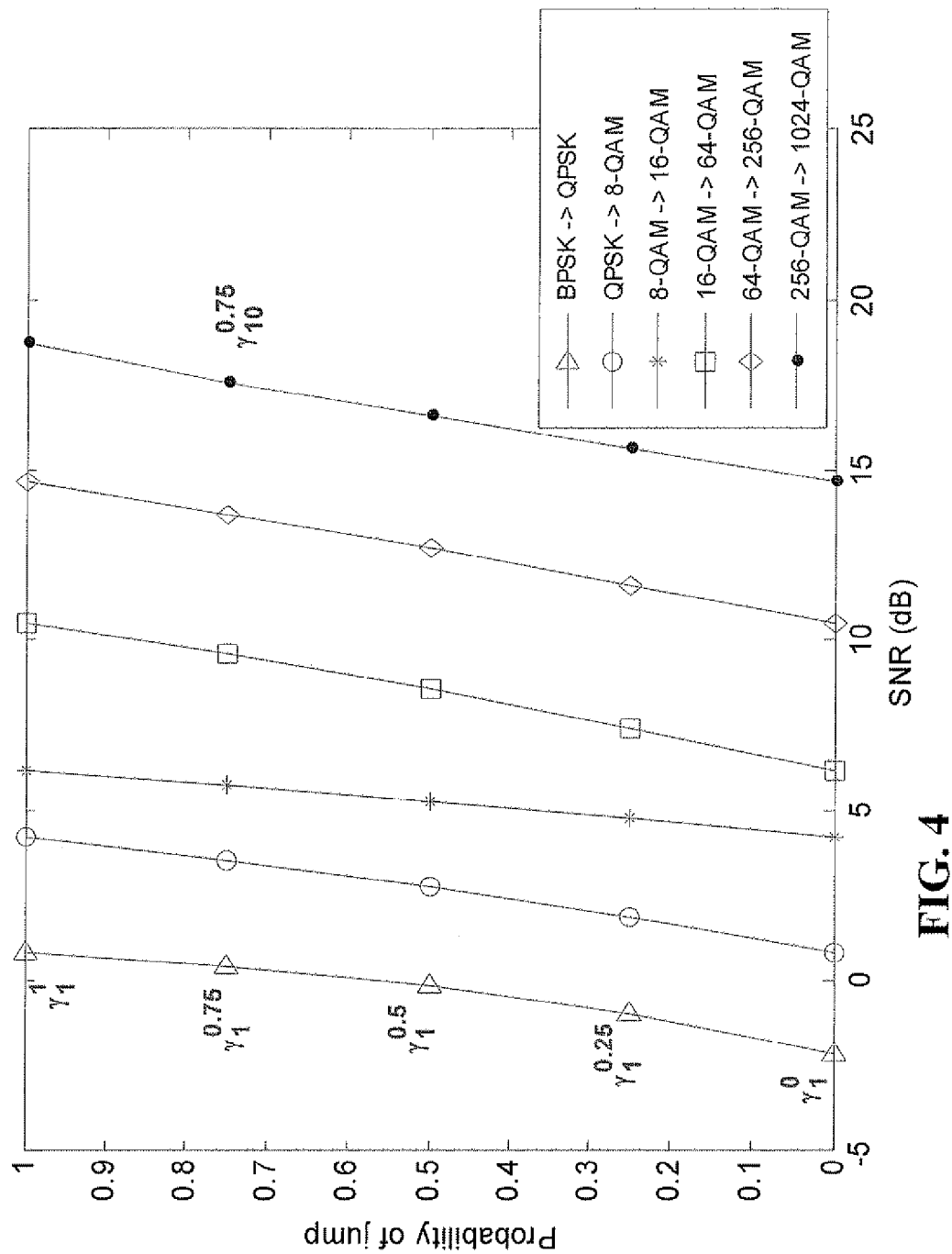
FIG. 4 is a graph of the probability of a jump vs. SNR of the HPAV system, with code rate R=½, over an AWGN channel with a target BLER of $10^{-1}$ in accordance with the present invention.

Steps V-VI are repeated for different jump probabilities, namely 0.5 and 0.75, and the values of $\gamma_{\{m\}}^{0.5}$ and $\gamma_{\{m\}}^{0.75}$ are computed and stored (point VII). According to point VIII, as illustrated in FIG. 4, it may be possible to compute the probability of a jump associated with a generic SNR within the range [−5 dB, 20 dB] by interpolating the points obtained up to now, which correspond to the marks of the curves. In particular, in FIG. 4, a linear interpolation has been used.

For example, at an SNR of 0 dB, the probability of a jump from a BPSK into a QPSK is about 0.55 while at an SNR of 10 dB the probability of a jump from a 16-QAM into a 64-QAM is about 0.85.

We observe that, in the reported example, three values of $\gamma_{\{m\}}^P$ for each constellation have been calculated, which means 18 values in total. The values $\gamma_{\{m\}}^0$ and $\gamma_{\{m\}}^1$ correspond to the SNR thresholds stored in the look-up table of the BTC algorithm, hence they are already available without the further computation. This computation can be made off-line, while the real-time processing of the signal may be limited to an interpolation. Therefore, the increase in complexity of the JPC with respect to the BTC algorithm is given by the uniform random number generator and the interpolating function. Achieving an accurate estimation of the probability of a jump for each SNR of interest may be of particular importance to enhance the performance of the JPC algorithm. In general, if the number of values computed off-line is relatively high, a coarse interpolation may be sufficient. On the other hand, if the number of these values is low, a more complex interpolation may be desired.

Numerical Results

The JPC bit loading algorithm applied to the HPAV system has been simulated and its performance is shown in terms of throughput and BLER versus SNR. For comparison purposes, the performance of the BTC bit loading algorithm is also reported.

Figure 5:
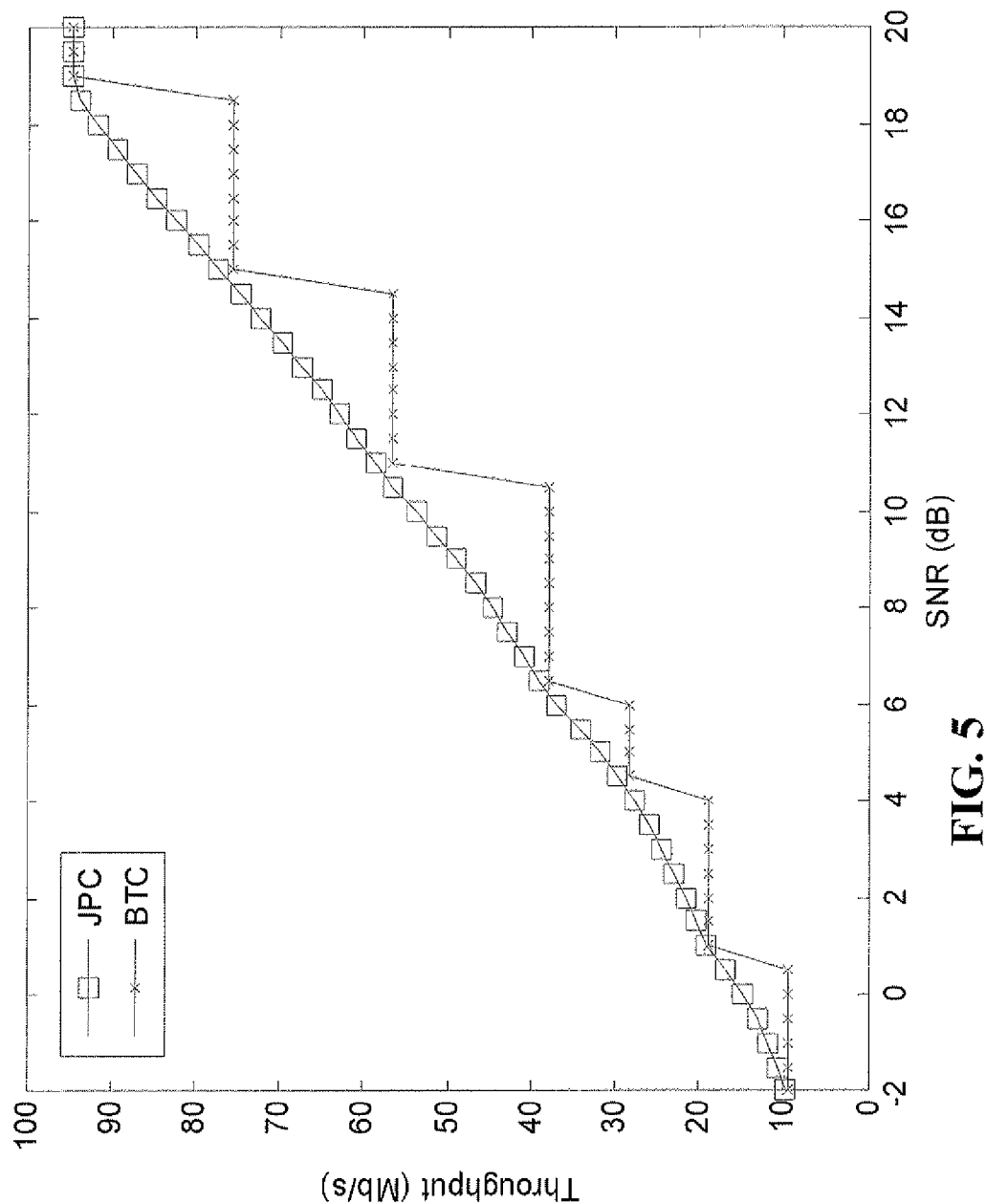
FIG. 5 depicts a graph of the throughput vs. SNR over an AWGN channel for R=½ in the case of the JPC in accordance with the present invention and the prior art BTC bit loading algorithms when a target BLER of $10^{-1}$ is considered.
Figure 6:
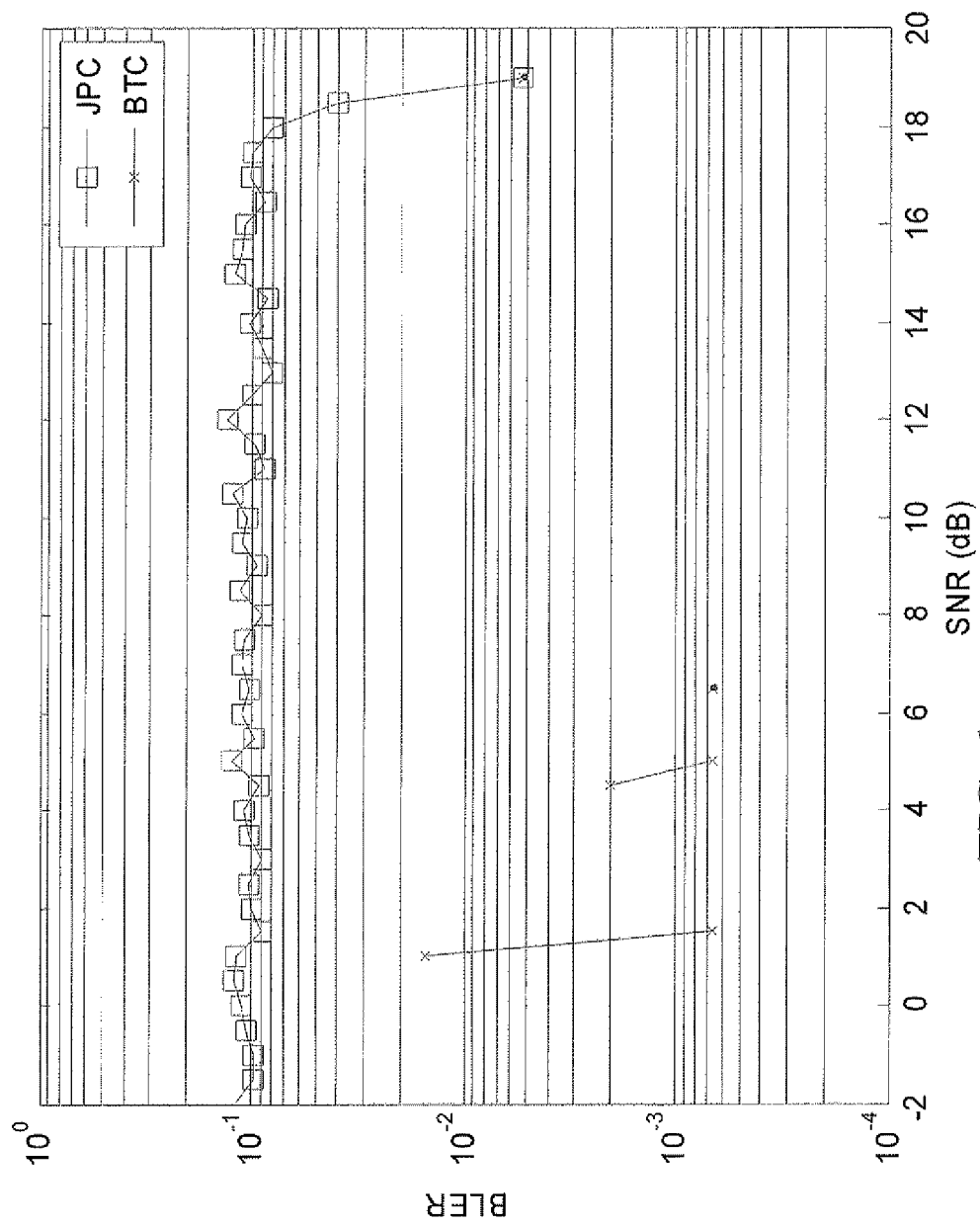
FIG. 6 is a graph of the BLER vs. SNR over an AWGN channel for R=½ in the case of the JPC in accordance with the present invention and the prior art ETC bit loading algorithms when a target BLER of $10^{-1}$ is considered.

In the following simulations, a target BLER of $10^{-1}$ is fixed, and the ideal case of the CSI known at the receiver is considered. First, an AWGN channel is considered. In FIG. 5 and in FIG. 6, the throughput and the BLER versus the SNR are shown, respectively, in the case of code rate R=½.

Figure 7:
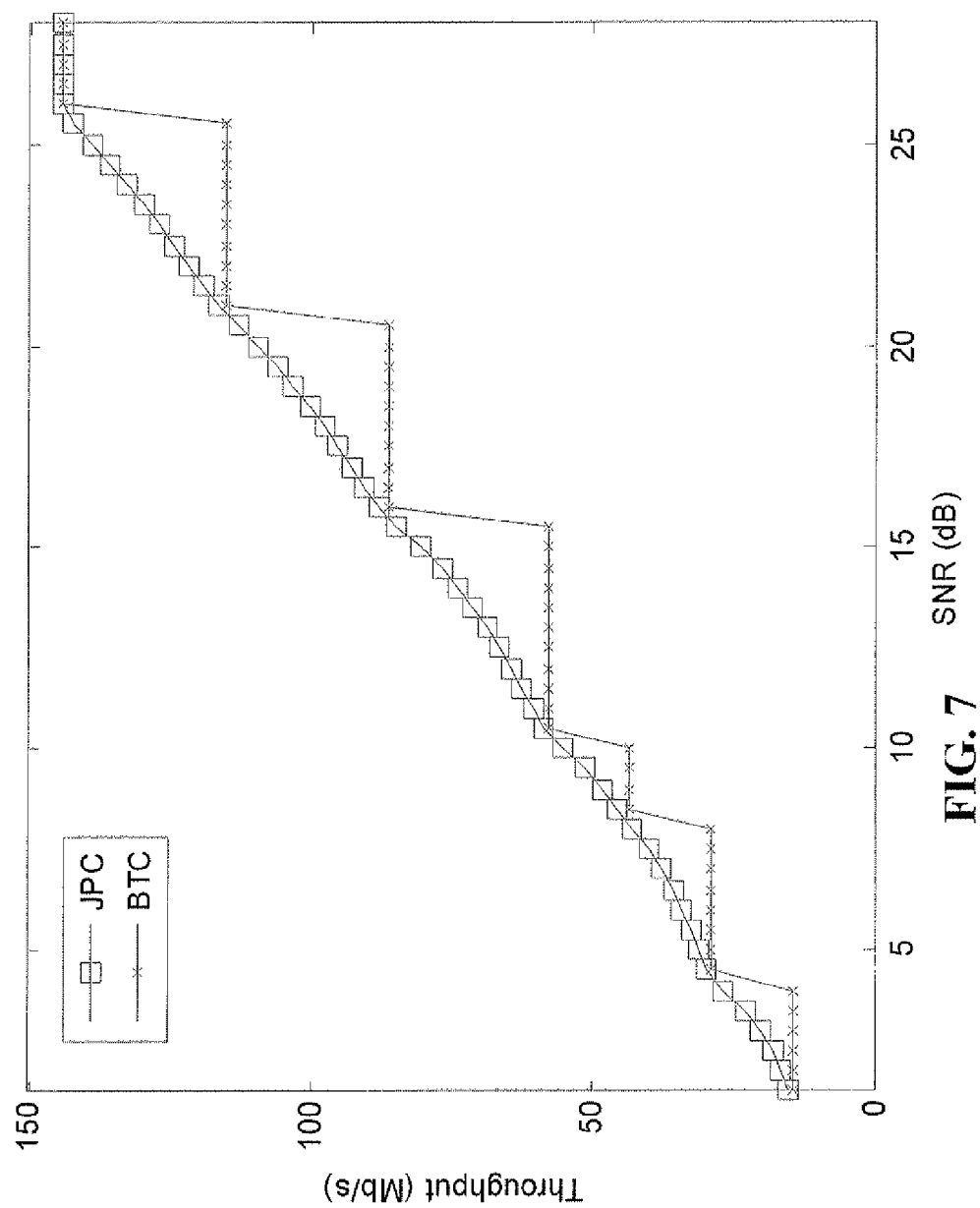
FIG. 7 is a graph of the throughput vs. SNR over an AWGN channel for R=16/21 in the case of the JPC in accordance with the present invention and the prior art ETC bit loading algorithms when a target BLER of $10^{-1}$ is considered.
Figure 8:
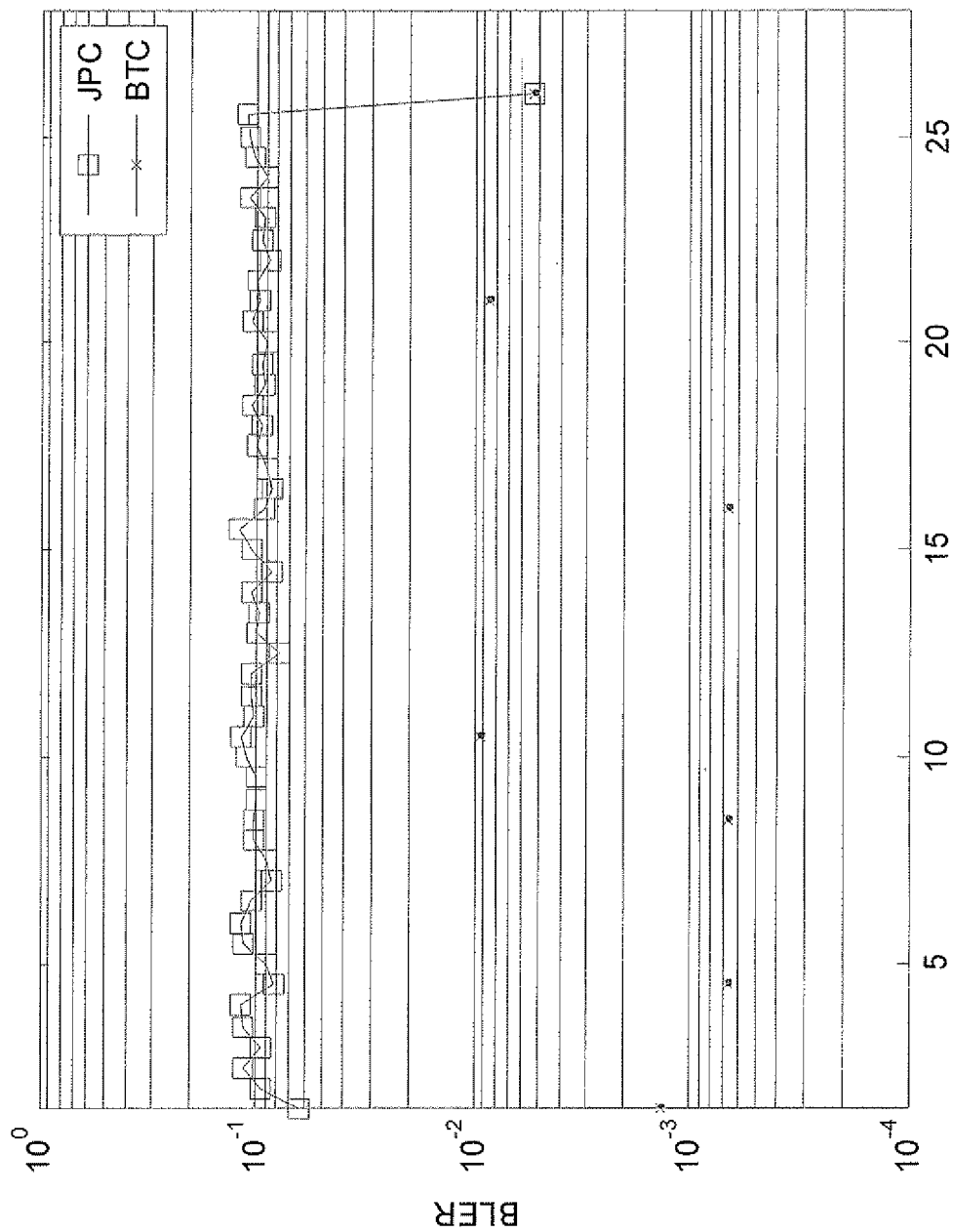
FIG. 8 is a graph of the BLER vs. SNR over an AWGN channel for R=16/21 in the case of the JPC in accordance with the present invention and the prior BTC bit loading algorithms when a target BLER of $10^{-1}$ is considered.

The classic ETC algorithm achieves the target with a relatively large margin, being the BLER almost null for all the SNR values. On the other hand, the JPC algorithm presents a BLER very close to the target, increasing the throughput compared to the BTC case. In FIG. 7 and in FIG. 8, similar results are depicted for the code rate R=16/21.

Figure 9:
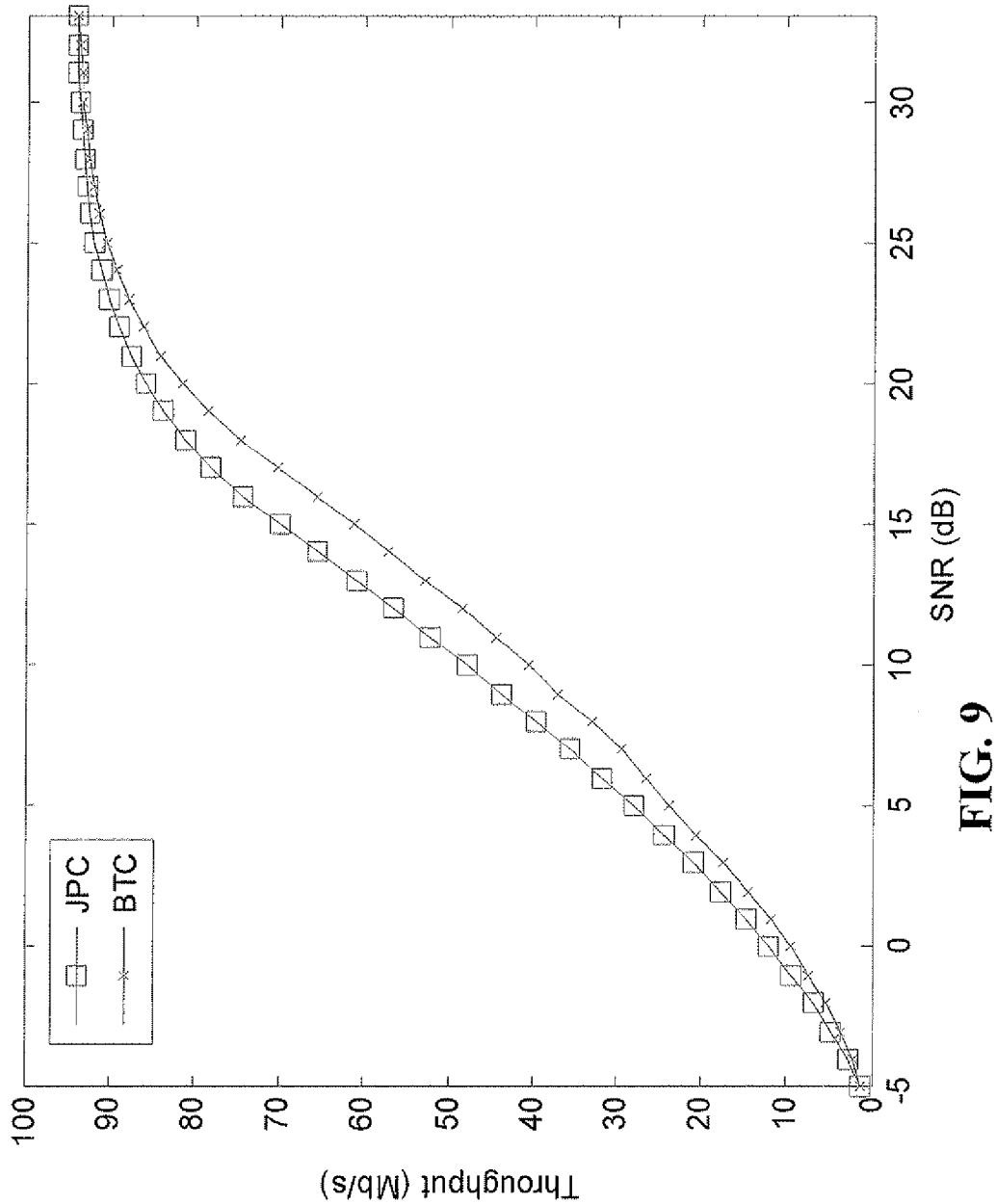
FIG. 9 is a graph of the throughput vs. SNR over the OPERA channel model 1 for R=½ in the case of the JPC in accordance with the present invention and the prior BTC bit loading algorithms when a target BLER of $10^{-1}$ is considered.

To investigate the proposed approach under a more realistic environment, a power line channel model is introduced. In particular, the multipath channel model proposed by the open power line communication European research alliance (OPERA) project is considered. (See for example, "OPERA project," http://www.ist-opera.org, and M. Babic, M. Hagenau, K. Dostert and J. Bausch, "Theoretical postulation of PLC channel model," OPERA, Tech. Rep., March 2005). In particular, the OPERA channel model 1 is employed, while the noise is AWGN. The throughput is calculated by averaging the allocated bits of the bit loading algorithms over many realizations of the considered channel model. In FIG. 9 and in FIG. 10 the throughput and the BLER versus the SNR are shown, respectively, in the case of the code rate R=½.

Figure 10:
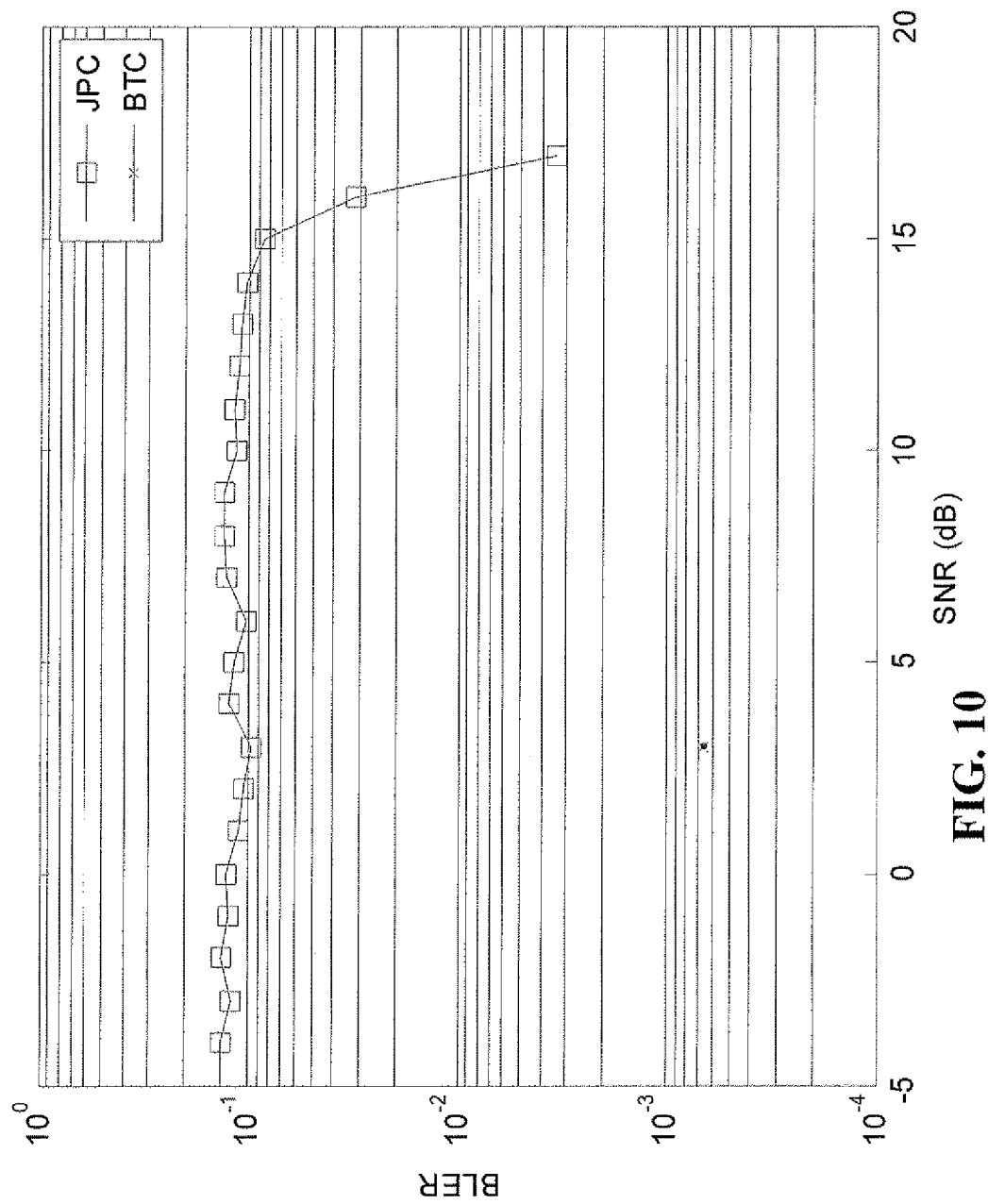
FIG. 10 is a graph of the BLER vs. SNR over the OPERA channel model 1 for R=½ in the case of the JPC in accordance with the present invention and the prior BTC bit loading algorithm when a target BLER of $10^{-1}$ is considered.
Figure 11:
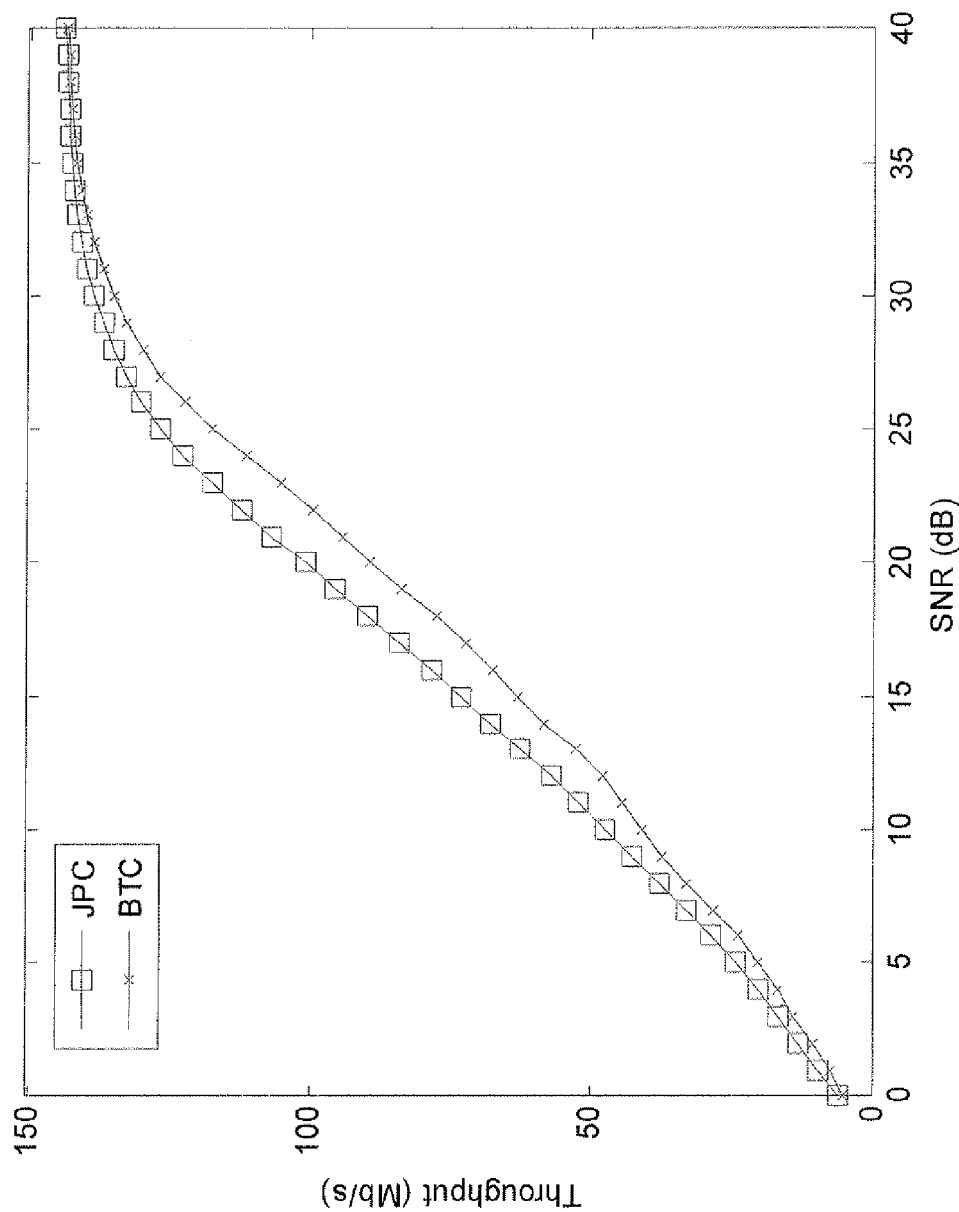
FIG. 11 is a graph of the throughput vs. SNR over the OPERA channel model 1 for R=16/21 in the case of the JPC in accordance with the present invention and the prior BTC bit loading algorithms when a target BLER of $10^{-1}$ is considered.

In FIG. 9, a gain in throughput of the JPC algorithm compared to the BTC is observed at every SNR; for example, at 15 dB it is almost 10 Mb/s. The gain is coupled with a reduction of the margin over the target BLER, as depicted in FIG. 10. In FIG. 11 and in FIG. 12, the throughput and the BLER versus the SNR are shown, respectively, in the case of the code rate R=16/21.

Figure 12:
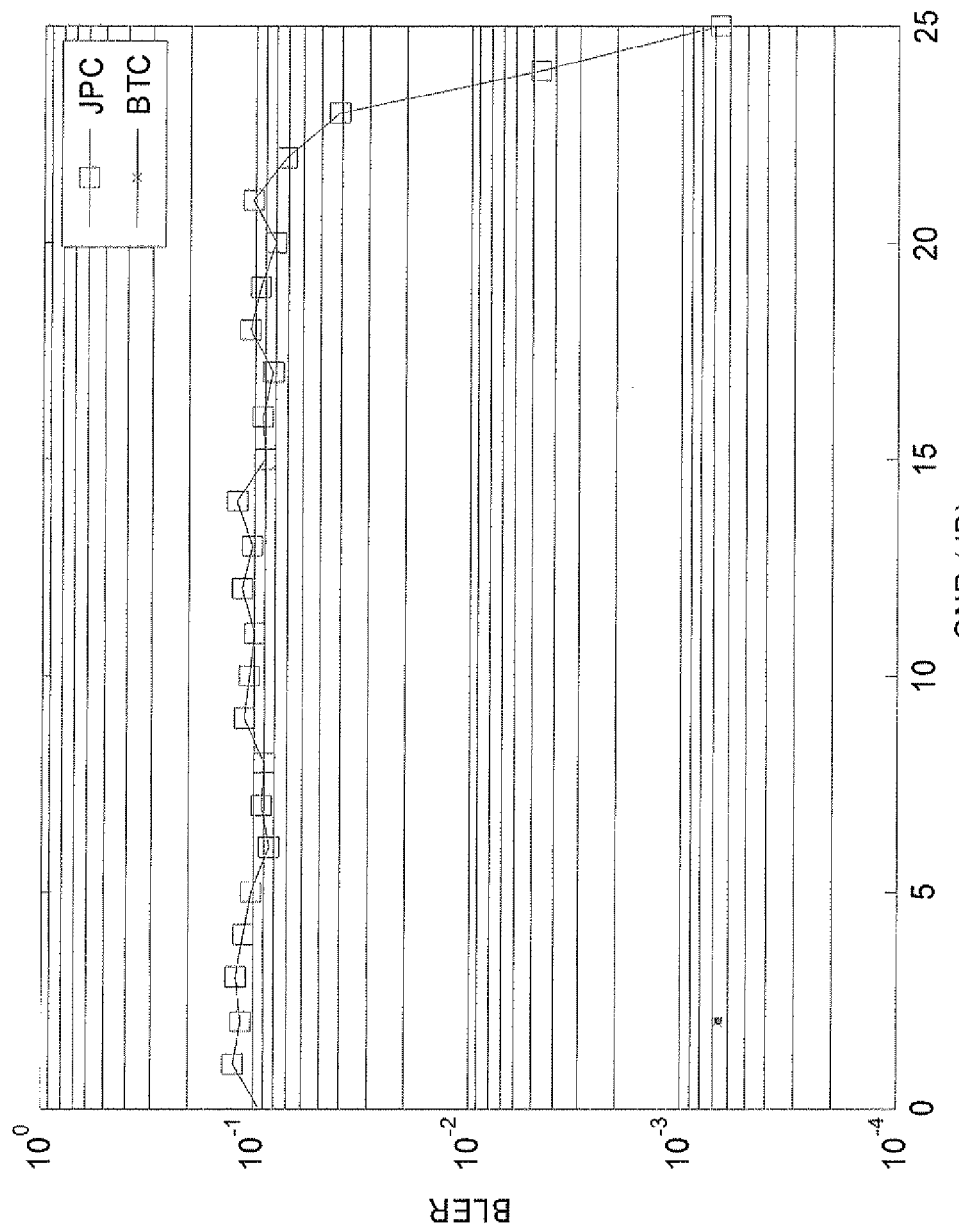
FIG. 12 is a graph of the BLER vs. SNR over the OPERA channel model 1 for R=16/21 in the case of the JPC in accordance with the present invention and the prior BTC bit loading algorithms when a target BLER of $10^{-1}$ is considered.

Similar results are observed. In particular, a gain in throughput of the JPC algorithm compared to the BTC is observed at every SNR, as shown in FIG. 11, with a gain of approximately 12 Mb/s at 20 dB. Moreover, FIG. 12 shows that the BLER is almost null in the BTC case, while it is very close to the target in the JPC case.

That which is claimed:

1. A method of transmitting symbols of a digital transmission constellation, the digital transmission constellation belonging to a set of digital transmission constellations ordered from a constellation with a smallest number of bits per symbol up to a constellation with a greatest number of bits per symbol, each digital transmission constellation having known respective error rate vs. signal-to-noise characteristics, the method comprising:
   identifying a number of bits m of a first digital transmission constellation from the set of digital transmission constellations that is configured to communicate up to a threshold error rate $\beta^{(T)}$ and having a greatest signal-to-noise ratio smaller than a signal-to-noise ratio of a received signal $\gamma$;
   identifying a number of bits $\breve{m}$ of a second digital transmission constellation from the set of digital transmission constellations that corresponds to a digital transmission constellation with a number of bits per symbol greater than the number of bits m of the first digital transmission constellation;
   determining a first probability of use 1−P of the first digital transmission constellation and a second probability of use P of the second digital transmission constellation that would generate an expected number of received erroneous bits corresponding to the threshold error rate $\beta^{(T)}$, the second probability of use being complementary to the first probability of use and being determined as a function of the error rate of the first and second digital transmission constellations $P_e^{(m)}(\gamma)$ $P_e^{(\breve{m})}(\gamma)$ corresponding to the signal-to-noise ratio of the received signal $\gamma$ and the number of bits m of the first digital transmission constellation and the number of bits $\breve{m}$ of the second digital transmission constellation; and
   transmitting a symbol with a digital transmission constellation selected randomly between the first and second digital constellations according to the first and second probabilities of use 1−P, P, respectively.

2. The method of claim 1, wherein the error rate comprises one of a bit-error-rate and a block-error-rate.

3. The method of claim 1, wherein the second probability of use P is determined according to the following equation:

$$P = \frac{(P_e^{(m)}(\gamma) - \beta^{(T)}) \cdot m}{(P_e^{(m)}(\gamma) - \beta^{(T)}) \cdot m - (P_e^{(\breve{m})}(\gamma) - \beta^{(T)}) \cdot \breve{m}}.$$

4. The method of claim 1, wherein the second probability of use P is determined by at least:
   determining a first discrete set of values ($\Omega$) of the signal-to-noise ratio of the received signal;
   determining a second discrete set of probability values ($\{\overline{P_1}, \overline{P_2}, \ldots, \overline{P_L}\}$) of the second probability of use;
   filling in a look-up table of signal-to-noise ratio limit values for each combination of a value ($\overline{P_i}$) of the second discrete set with a digital transmission constellation of the set of digital transmission constellations by at least
   for each signal-to-noise ratio of the received signal of the first discrete set ($\Omega$)

determining an average number of bits of a symbol to be transmitted as an average of the number of bits m̆ of a symbol of the second digital transmission constellation and the number of bits m of the first digital transmission constellation weighted with the second probability of use ($\overline{P_i}$) of the second discrete set and the complementary value thereof (1−$\overline{P_i}$), respectively, and estimating the error rate corresponding to an average number of bits of a symbol and of a value of the first discrete set, and for the combination of a value ($\overline{P_i}$) of the second discrete set with the digital transmission constellation, storing a signal-to-noise ratio limit value configured to communicate at the threshold error rate $\beta^{(T)}$; and determining the second probability of use P as a function of the signal-to-noise ratio of the received signal γ, by one of reading from the look-up table a probability value corresponding to the signal-to-noise ratio of the received signal γ and interpolating probability values corresponding to the signal-to-noise ratios limit values closest to the signal-to-noise ratio of the received signal γ.

5. The method of claim 1, wherein the set of digital transmission constellations comprises at least one of BPSK, QPSK, 8-QAM, 16-QAM, 64-QAM, 256-QAM and 1024-QAM.

6. The method of claim 1, wherein the symbols are transmitted according to a multi-carrier modulation; and wherein the steps of the method are executed for each used carrier.

7. A non-transitory computer-readable medium for use with circuit configured to transmit symbols of a digital transmission constellation, the digital transmission constellation belonging to a set of digital transmission constellations ordered from a constellation with a smallest number of bits per symbol up to a constellation with a greatest number of bits per symbol, each digital transmission constellation having known respective error rate vs. signal-to-noise characteristics, the computer-executable instructions for causing the circuit to perform the method comprising:

identifying a number of bits m of a first digital transmission constellation from the set of digital transmission constellations that is configured to communicate up to a threshold error rate $\beta^{(T)}$ and having a greatest signal-to-noise ratio smaller than a signal-to-noise ratio of a received signal γ;

identifying a number of bits m̆ of a second digital transmission constellation from the set of digital transmission constellations that corresponds to a digital transmission constellation with a number of bits per symbol greater than the number of bits m of the first digital transmission constellation;

determining a first probability of use 1−P of the first digital transmission constellation and a second probability of use P of the second digital transmission constellation that would generate an expected number of received erroneous bits corresponding to the threshold error rate $\beta^{(T)}$, the second probability of use being complementary to the first probability of use and being determined as a function of the error rate of the first and second digital transmission constellations $P_e^{(m)}(\gamma)$ $P_e^{(\tilde{m})}(\gamma)$ corresponding to the signal-to-noise ratio of the received signal γ and the number of bits m of the first digital transmission constellation and the number of bits m̆ of the second digital transmission constellation; and transmitting a symbol with a digital transmission constellation selected randomly between the first and second digital constellations according to the first and second probabilities of use 1−P, P, respectively.

8. The non-transitory computer-readable medium of claim 7, wherein the error rate comprises one of a bit-error-rate and a block-error-rate.

9. The non-transitory computer-readable medium of claim 7, wherein the computer-executable instructions are for causing the circuit to determine the second probability of use P according to the following equation:

$$P = \frac{(P_e^{(m)}(\gamma) - \beta^{(T)}) \cdot m}{(P_e^{(m)}(\gamma) - \beta^{(T)}) \cdot m - (P_e^{(\tilde{m})}(\gamma) - \beta^{(T)}) \cdot \tilde{m}}.$$

10. The non-transitory computer-readable medium of claim 7, wherein the computer-executable instructions for causing the circuit to determine the second probability of use P by at least:

determining a first discrete set of values (Ω) of the signal-to-noise ratio of the received signal;

determining a second discrete set of probability values ({$\overline{P_1}, \overline{P_2}, \ldots, \overline{P_L}$}) of the second probability of use;

filling in a look-up table of signal-to-noise ratio limit values for each combination of a value ($\overline{P_i}$) of the second discrete set with a digital transmission constellation of the set of digital transmission constellations by at least for each signal-to-noise ratio of the received signal of the first discrete set (Ω)

determining an average number of bits of a symbol to be transmitted as an average of the number of bits m̆ of a symbol of the second digital transmission constellation and the number of bits m of the first digital transmission constellation weighted with the second probability of use ($\overline{P_i}$) of the second discrete set and the complementary value thereof (1−$\overline{P_i}$), respectively, and estimating the error rate corresponding to an average number of bits of a symbol and of a value of the first discrete set, and for the combination of a value ($\overline{P_i}$) of the second discrete set with the digital transmission constellation, storing a signal-to-noise ratio limit value configured to communicate at the threshold error $\beta^{(T)}$; and determining the second probability of use P as a function of the signal-to-noise ratio of the received signal γ, by one of reading from the look-up table a probability value corresponding to the signal-to-noise ratio of the received signal γ and interpolating probability values corresponding to the signal-to-noise ratios limit values closest to the signal-to-noise ratio of the received signal γ.

11. The non-transitory computer-readable medium of claim 7, wherein the set of digital transmission constellations comprises at least one of BPSK, QPSK, 8-QAM, 16-QAM, 64-QAM, 256-QAM and 1024-QAM.

12. The non-transitory computer-readable medium of claim 7, wherein the symbols are transmitted according to a multi-carrier modulation; and wherein the computer-executable instructions are for causing the circuit to execute for each used carrier.

13. A communication system comprising:

a circuit configured to transmit symbols of a digital transmission constellation, the digital transmission constellation belonging to a set of digital transmission constellations ordered from a constellation with a smallest number of bits per symbol up to a constellation with a greatest number of bits per symbol, each digital transmission constellation having known respective error rate vs. signal-to-noise characteristics, wherein said circuit is configured to transmit the symbols of the digital constellation by at least
- identifying a number of bits m of a first digital transmission constellation from the set of digital transmission constellations that is configured to communicate up to a threshold error rate $\beta^{(T)}$ and having a greatest signal-to-noise ratio smaller than a signal-to-noise ratio of a received signal $\gamma$,
- identifying a number of bits $\breve{m}$ of a second digital transmission constellation from the set of digital transmission constellations that corresponds to a digital transmission constellation with a number of bits per symbol greater than that of the first digital transmission constellation,
- determining a first probability of use 1−P of the first digital transmission constellation and a second probability of use P of the second digital transmission constellation that would generate an expected number of received erroneous bits corresponding to the threshold error rate $\beta^{(T)}$, the second probability of use being complementary to the first probability of use and being determined as a function of the error rate of the first and second digital transmission constellations $P_e^{(m)}(\gamma)$ $P_e^{(\breve{m})}(\gamma)$ corresponding to the signal-to-noise ratio of the received signal $\gamma$ and a number of bits m of the first digital transmission constellation and the number of bits $\breve{m}$ of the second digital transmission constellation, and
- transmitting a symbol with a digital transmission constellation selected randomly between the first and second digital constellations according to the first and second probabilities of use 1−P, P, respectively.

14. The communication system of claim 13, wherein the error rate comprises one of a bit-error-rate and a block-error-rate.

15. The communication system of claim 13, wherein said circuit is configured to determine the second probability of use P according to the following equation:

$$P = \frac{(P_e^{(m)}(\gamma) - \beta^{(T)}) \cdot m}{(P_e^{(m)}(\gamma) - \beta^{(T)}) \cdot m - (P_e^{(\breve{m})}(\gamma) - \beta^{(T)}) \cdot \breve{m}}.$$

16. The communication system of claim 13, wherein said circuit is configured to determine the second probability of use P by at least:
- determining a first discrete set of values ($\Omega$) of the signal-to-noise ratio of the received signal;
- determining a second discrete set of probability values ($\{\overline{P_1}, \overline{P_2}, \ldots, \overline{P_L}\}$) of the second probability of use;
- filling in a look-up table of signal-to-noise ratio limit values for each combination of a value ($\overline{P_i}$) of the second discrete set with a digital transmission constellation of the set of digital transmission constellations by at least
  - for each signal-to-noise ratio of the received signal of the first discrete set ($\Omega$)
    - determining an average number of bits of a symbol to be transmitted as an average of the number of bits $\breve{m}$ of a symbol of the second digital transmission constellation and the number of bits m of the first digital transmission constellation weighted with the second probability of use ($\overline{P_i}$) of the second discrete set and the complementary value thereof ($1-\overline{P_i}$), respectively, and
    - estimating the error rate corresponding to an average number of bits of a symbol and of a value of the first discrete set, and
  - for the combination of a value ($\overline{P_i}$) of the second discrete set with the digital transmission constellation, storing a signal-to-noise ratio limit value configured to communicate at the threshold error rate $\beta^{(T)}$; and
- determining the second probability of use P as a function of the signal-to-noise ratio of the received signal $\gamma$, by one of reading from the look-up table a probability value corresponding to the signal-to-noise ratio of the received signal $\gamma$ and interpolating probability values corresponding to the signal-to-noise ratios limit values closest to the signal-to-noise ratio of the received signal $\gamma$.

17. The communication system of claim 13, wherein the set of digital transmission constellations comprises at least one of BPSK, QPSK, 8-QAM, 16-QAM, 64-QAM, 256-QAM and 1024-QAM.

18. The communication system of claim 13, wherein said circuit is configured to transmit symbols according to a multi-carrier modulation and execute for each used carrier.

19. The communication system of claim 13, wherein said circuit comprises a powerline transmission circuit.

* * * * *